United States Patent
Suarez et al.

(10) Patent No.: US 8,147,663 B2
(45) Date of Patent: Apr. 3, 2012

(54) SCAFFOLD FOR AN ION-CONDUCTIVE MEMBRANE

(75) Inventors: Scott Suarez, Salt Lake City, UT (US); Steven Matthew Quist, Salt Lake City, UT (US)

(73) Assignee: Cekamatec, Inc, Salt Lake City, UT (US)

( * ) Notice: Subject to any disclaimer, the term of this patent is extended or adjusted under 35 U.S.C. 154(b) by 264 days.

(21) Appl. No.: 12/689,985

(22) Filed: Jan. 19, 2010

(65) Prior Publication Data

US 2010/0181189 A1   Jul. 22, 2010

Related U.S. Application Data

(60) Provisional application No. 61/145,423, filed on Jan. 16, 2009.

(51) Int. Cl.
C25B 13/02 (2006.01)
C25B 9/08 (2006.01)
C25B 9/10 (2006.01)

(52) U.S. Cl. ............ 204/295; 204/278.5; 204/252; 204/263; 204/282; 204/283; 95/45; 96/4

(58) Field of Classification Search ............ 204/295, 204/278.5, 252, 263, 282, 283; 95/45; 96/4
See application file for complete search history.

(56) References Cited

U.S. PATENT DOCUMENTS

| | | | |
|---|---|---|---|
| 6,852,205 B1 * | 2/2005 | Toyoshima et al. | 204/288 |
| 2003/0134169 A1 | 7/2003 | Sarkar et al. | |
| 2005/0167354 A1 | 8/2005 | Caze et al. | |
| 2005/0214613 A1 | 9/2005 | Sarkar et al. | |
| 2006/0073373 A1 * | 4/2006 | Andrin et al. | 429/36 |
| 2008/0096090 A1 * | 4/2008 | Cipollini et al. | 429/40 |
| 2008/0110008 A1 * | 5/2008 | Walchli et al. | 29/407.08 |
| 2009/0090638 A1 * | 4/2009 | Kelly et al. | 205/406 |

OTHER PUBLICATIONS

Jo, Soo I., "Written Opinion of The International Searching Authority", International App. No. PCT/US2010/021421, (Sep. 29, 2010), 1-4.

Jo, Soo I., "International Search Report", International App. No. PCT/US2010/021421, (Sep. 29, 2010), 1-5.

* cited by examiner

*Primary Examiner* — Bruce Bell
(74) *Attorney, Agent, or Firm* — David Fonda

(57) ABSTRACT

A scaffold holding one or more ion-conductive ceramic membranes for use in an electrochemical cell is described. Generally, the scaffold includes a thermoplastic plate defining one or more orifices. Each orifice is typically defined by a first, second, and third aperture, wherein the second aperture is disposed between the first and third apertures. The diameter of the second aperture can be larger than the diameters of the first and third apertures. While at an operating temperature the diameter of the ceramic membrane is larger than the diameters of the first and third apertures, heating the scaffold to a sufficient temperature and for a sufficient time causes the third aperture's diameter to become larger than the membrane's diameter. Thus, heating the scaffold may allow the membrane to be inserted into the orifice. Cooling the scaffold can then cause the third aperture's diameter to shrink and trap the membrane within the orifice.

35 Claims, 7 Drawing Sheets

SCAFFOLD FOR AN ION-CONDUCTIVE MEMBRANE

CROSS-REFERENCE TO RELATED APPLICATIONS

This application claims the benefit of U.S. Provisional Application No. 61/145,423, filed Jan. 16, 2009, entitled "Selective Ion Transport Membrane Based Electrolytic Cell," the entire disclosure of which is hereby incorporated by reference.

FIELD OF THE INVENTION

The present invention relates in general to electrochemical cells. More particularly, the present invention relates to a membrane scaffold that is intended for use in an electrochemical cell. Generally, the membrane scaffold comprises at least one orifice that holds an ion-conductive ceramic membrane in a manner that forms a hermetic edge seal between an outermost perimeter of the ceramic membrane and an inner surface of the orifice.

BACKGROUND OF THE INVENTION

Electrochemical cells comprising ion-conductive membranes are known mechanisms that are used for a variety of applications. Some of these applications include the synthesis and production of a variety of chemicals, such as sodium hydroxide, hydrochloric acid, sodium hypochlorite, and a vast array of other chemicals; the purification of a variety of metals; the production of number of pharmaceutical products; the electrolysis of a variety of ionic materials; the plating of certain metals; and several other conventional uses.

A planar electrolytic cell, which is also known as a plate and frame cell, is one of the many types of electrochemical cells that are commercially available. As a general rule, these planar electrolytic cells comprise a plurality of frames that include at least one flow promoter frame comprising an anode electrode ("anode flow promoter"), at least one flow promoter frame comprising a cathode electrode ("cathode flow promoter"), and at least one frame comprising an ion-conductive polymeric membrane, such as a NaFION® membrane, produced by DuPont, Wilmington, Del. In the cell, each frame comprising the ion-conductive polymeric membrane is disposed between and interfaces with an anode flow promoter and a cathode flow promoter. Accordingly, as an anolyte solution flows through the anode flow promoter and as a catholyte solution flows through the cathode flow promoter, the frame comprising the ion-conductive polymeric membrane separates the anolyte solution from the catholyte solution in a manner that allows certain ions to selectively pass between the two solutions.

Certain polymeric membranes, such as NaFION® membranes, are flexible and can be connected to a frame in a manner that allows the frame and membrane to create a hermetically sealed barrier between the anolyte and catholyte solutions. In contrast, some ceramic membranes tend to be more difficult to attach to a frame in a manner that produces a reliable, long-lasting, hermetic seal between the anolyte solution and the catholyte solution in a planar electrolytic cell.

Because it is desirable to use ion-conductive ceramic membranes in planar electrolytic cells, there is a need in the art for a system and method for connecting an ion-conductive ceramic membrane to a frame in a manner that allows the ceramic membrane to form a reliable, long-lasting hermetic seal between the catholyte solution and the anolyte solution in a planar electrolytic cell.

BRIEF SUMMARY OF THE INVENTION

The present invention generally relates to a membrane scaffold that holds at least one ion-conductive ceramic membrane in a manner that creates a reliable, long-lasting, hermetic seal between the ceramic membrane and the scaffold. Accordingly, the scaffold can be used in an electrolytic cell to separate an anolyte solution from a catholyte solution while allowing specific ions to selectively pass between the two solutions.

Generally, the scaffold includes a thermoplastic plate (which may refer to a plate that is capable of expanding when heated and then contracting from its expanded size when the plate is cooled) that defines at least one orifice housing a circular ceramic membrane. In some cases, the orifice is defined by a first, second, and third aperture, wherein the second aperture is sandwiched between the first and third apertures.

In some instances, each of the 3 apertures has a different diameter. Indeed, in one non-limiting example, while the second aperture has a diameter that is larger than the diameters of both the first and third apertures, the first aperture has a diameter that is smaller than the diameter of the third aperture. Additionally, in this example, when the scaffold is at a typical operating temperature of an electrochemical cell, the diameter of the ceramic membrane is smaller than the diameter of the second aperture but larger than the diameters of both the first and third apertures.

In some implementations, when the thermoplastic plate is heated to a sufficient temperature, for a sufficient period of time, the diameter of the third aperture expands to become larger than the diameter of the ceramic membrane. In such implementations, the diameter of the first aperture may also expand while still remaining smaller than the diameter of the ceramic membrane. Accordingly, when the thermoplastic plate is properly heated, the ceramic membrane can be inserted through the third aperture so that the membrane becomes seated within the second aperture. When the thermoplastic plate is allowed to cool, the diameter of the third aperture contracts to become smaller than the ceramic membrane's diameter. Thus, where the ceramic membrane is seated within the orifice, the membrane becomes trapped in the orifice as the thermoplastic plate cools and the third diameter returns to its original size. Additionally, where a seal, such as an O-ring, is disposed within the orifice, the outermost perimeter of the ceramic membrane may be hermetically sealed with an inner surface of the second aperture as the plate cools and the second aperture constricts around the O-ring and the membrane.

With regards to the material used to make the thermoplastic plate, the plate may comprise any material that is suitable for use in an electrolytic cell and that has a coefficient of thermal expansion that is sufficient to allow the plate to expand and contract as described above. The material should be chemically compatible and stable in the anolyte and catholyte solutions of the electrolytic cell. Non-limiting examples of suitable materials used to make the thermoplastic plate include polypropylene and high density polyethylene.

With respect to the ceramic membrane, this membrane can comprise any suitable ceramic membrane that is capable of selectively transporting cations between an anolyte solution and a catholyte solution. Some examples of such ceramic materials include, but are not limited to, NaSICON-type materials, LiSICON-type materials, KSICON type materials, and β alumina-type ceramic materials. Other alkali ion selective ceramic materials may also be used.

After the components of the membrane scaffold are assembled, the scaffold may be used in any suitable electrolytic cell. In some implementations, however, the scaffold is used in a planar electrolytic cell. In such implementations, the cell can have any suitable characteristic. Indeed, in one non-limiting example, the cell comprises one or more: membrane scaffolds, anode flow promoters, and cathode flow promoters. In this example, each of the membrane scaffolds interface and mate with one anode flow promoter and one cathode flow promoter. Additionally, in this example, 1-2 endplates are disposed at each end of the cell and are connected to a corresponding endplate on the opposite side of the cell in and manner that allows the opposing endplates, and the frames between them, to be tightened together.

These features and advantages of the present invention will become more fully apparent from the following description and appended claims, or may be learned by the practice of the invention as set forth hereinafter.

BRIEF DESCRIPTION OF THE SEVERAL DRAWINGS

In order that the manner in which the above-recited and other features and advantages of the invention are obtained and will be readily understood, a more particular description of the invention briefly described above will be rendered by reference to specific embodiments thereof that are illustrated in the appended drawings. Understanding that the drawings depict only typical embodiments of the invention, are not necessarily drawn to scale, and are not therefore to be considered to be limiting of its scope, the invention will be described and explained with additional specificity and detail through the use of the accompanying drawings in which:

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of suitable ion-conductive ceramic membranes, scaffold materials, etc., to provide a thorough understanding of embodiments of the invention. One having ordinary skill in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
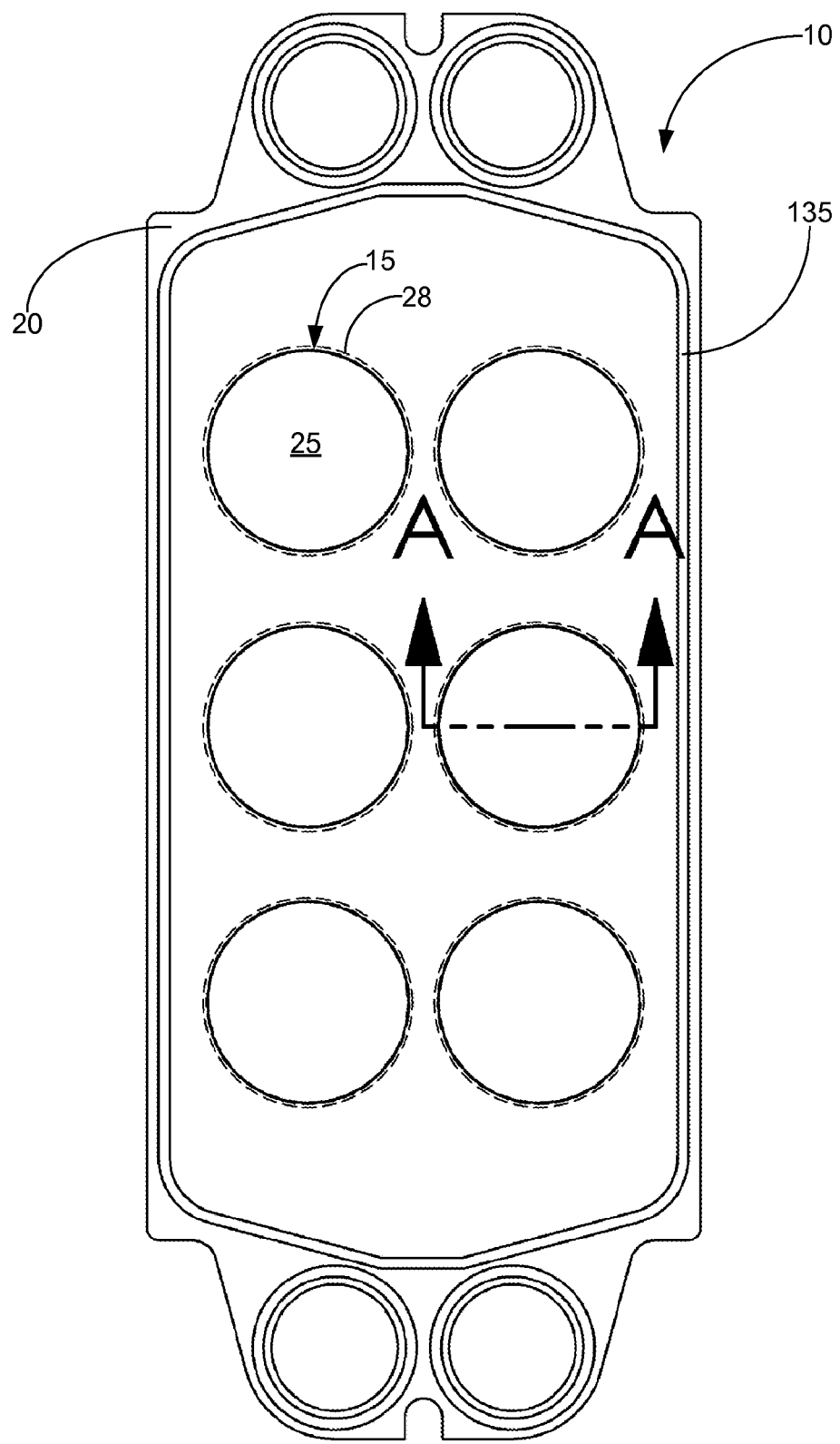
FIG. 1 depicts a schematic diagram of a representative embodiment of a membrane scaffold comprising a plurality of ion-conductive ceramic membranes.

Embodiments of the present invention provide a membrane scaffold that is intended for use in a planar electrolytic cell. Specifically, the membrane scaffold is designed to provide a hermetic seal that both prevents an anolyte solution and a catholyte solution in an electrochemical cell from mixing and that allows certain cations to be selectively transported through the ceramic membrane and between the two solutions. While the membrane scaffold can comprise any suitable component, FIG. 1 shows a non-limiting embodiment in which the membrane scaffold 10 comprises at least one orifice 15 that is defined in a thermoplastic plate 20, an ion-conductive ceramic membrane 25 that is disposed within each orifice 15, and an O-ring 28 (shown by the dashed lines) that forms a seal between each ceramic membrane 25 and the orifice 15 in which the membrane 25 is disposed. To provide a better understanding of the scaffold 10, each of the aforementioned components is discussed below in more detail.

With respect to the orifice 15, the scaffold 10 can comprise any suitable number of orifices 15 that allow the scaffold 10 to function as desired for a particular application. Indeed, in some embodiments, the scaffold 10 comprises 1, 2, 3, 4, 5, 6, 7, 8, or more orifices 15. By way of illustration, FIG. 1 shows an embodiment in which the scaffold 10 comprises 6 orifices 15.

Each orifice 15 may have any suitable characteristic that allows it to receive and seal a ceramic membrane 25 therein. In one non-limiting example, each orifice 15 may be any suitable shape, including being circular, as illustrated in FIG. 1. In this example, the circular shape of the orifice 15 may provide the membrane scaffold 10 with several beneficial characteristics. For instance, the circular shape of the orifice 15 may allow the orifice 15 to create a uniform seal around a circular ceramic membrane 25 without the formation of stress risers in the seal. Similarly, the circular shape of the orifice 15 may allow the orifice 15 and a corresponding ceramic membrane 25 to be machined to precise and accurate tolerances at a relatively low cost. Moreover, the orifice's circular shape may allow the orifice 15 to expand uniformly and radially as the scaffold 10 is heated (as discussed hereinafter). Each scaffold 10 may comprise a gasket 135 that extends around the orifices 15 that are defined in the plate 20. This will help create a seal when the gasket is attached to other parts of the electrochemical cell such as the flow promoters or end plates.

Each orifice 15 can have the ceramic membrane 25 sealed therein in any manner that allows the membrane 25 to be hermetically sealed in the scaffold 10 and to function as intended. By way of non-limiting example, each orifice 15 may be configured to be sealed with the ceramic membrane 25 through the use of a face-seal method and/or the use of an edge-seal method. To better explain these methods, FIGS. 2A and 2B respectively provide illustrations of a cross-sectional view of a representative embodiment of a ceramic membrane 25 in which a membrane 25 is sealed through a face-seal method and an edge-seal method. For the sake of simplicity, the scaffold 10 is not shown in FIGS. 2A and 2B.

Figure 2A:
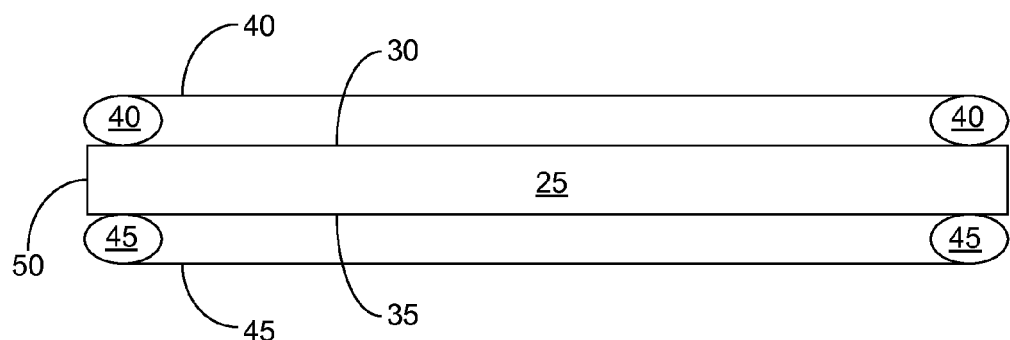
FIG. 2A depicts a cross-sectional view of a representative embodiment of a method for sealing a ceramic membrane through a face-seal method.
Figure 2B:
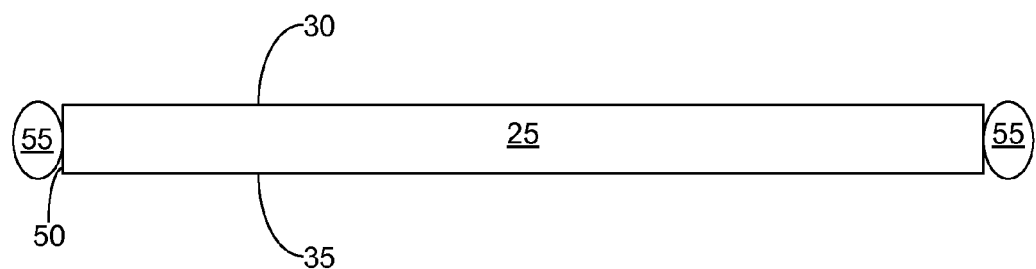
FIG. 2B depicts a cross-sectional view of a representative embodiment of a method for sealing the ceramic membrane through an edge-seal method.

With respect to FIG. 2A, that figure shows an embodiment in which a first face 30 and a second face 35 of the ceramic membrane 25 are respectively face sealed by a first O-ring 40 and a second 45 O-ring. In contrast, FIG. 2B illustrates an embodiment in which an outermost perimeter 50 of the membrane 25 is edge sealed by a single O-ring 55.

While the described face-seal method may be used in some embodiments, the face-seal method may have some shortcomings. For example, the face-seal method may allow ions to accumulate within the ceramic membrane 25, between the first 40 and the second 45 O-rings. Overtime, this concentration of ions trapped within the ceramic membrane 25 can cause the membrane 25 to crack or degrade, or may otherwise act to shorten the membrane's functional life. In contrast, under a non-binding theory, Applicant believes that the edge-seal method may prevent or reduce the shortcomings associated with the face-seal method and, thereby, allow the ceramic membrane 25 to function more effectively and/or for a longer period of time than embodiments in which the membrane 25 is face sealed within an orifice 15. Due to the benefits associated with edge sealing, in some embodiments, a ceramic membrane 25 is sealed within the orifice 15 through the edge-seal method. Where the ceramic membrane 25 is sealed within the orifice 15 through the described edge-seal method, the orifice 15 can have any suitable characteristic that allows a hermetic edge seal to be formed between the membrane's outermost perimeter 50 and an internal surface of the orifice 15.

Figure 3A:
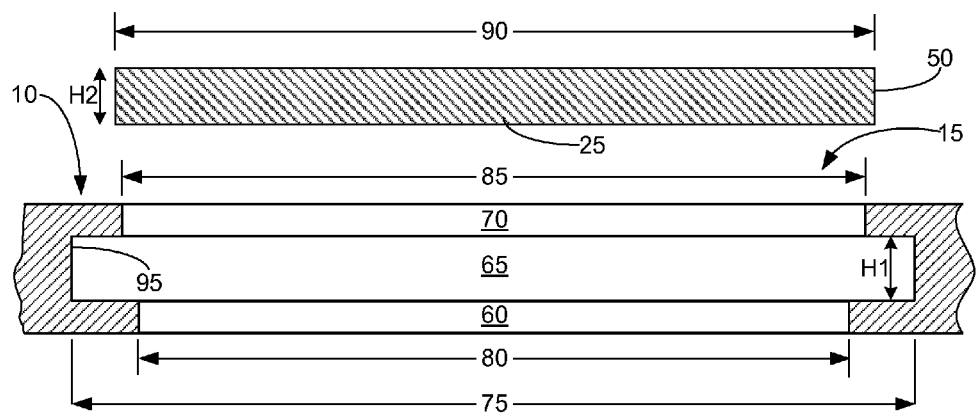
FIG. 3A depicts a cross-sectional view of the membrane scaffold from FIG. 1 cut along line A-A, wherein the ceramic membrane from FIG. 1 is disposed outside the scaffold.

Turning now to FIG. 3A a representative embodiment is shown in which the orifice 15 is defined by a first aperture 60, a second aperture 65, and a third aperture 70, wherein the second aperture 65 is disposed between the first 60 and the third 70 apertures. As discussed herein throughout, reference is made to first, second, third, and fourth diameters. This does not necessarily mean that any one orifice or aperture or membrane has multiple diameters. Rather, in most instances, the first diameter refers to the diameter of the first aperture; the second diameter refers to the diameter of the second aperture; the third diameter refers to the diameter of the third aperture; and the fourth diameter refers to the diameter of the ceramic membrane.

Where the orifice 15 comprises 3 apertures, the various apertures can have any suitable characteristic that allows the orifice 15 to receive the ceramic membrane 25 and edge seal the membrane 25 within the orifice 15. In one non-limiting example, FIG. 3A shows an embodiment in which the second aperture 65 has a second diameter 75 that is larger than the first diameter 80 of the first aperture 60 and the third diameter 85 of the third aperture 70. Moreover, FIG. 3A shows that the third diameter 85 of the third aperture 70 is larger than the first diameter 80 of the first aperture 60.

In another non-limiting example a characteristic of the apertures (60, 65, and 70), FIG. 3A shows that when the scaffold 10 is at an operating temperature (or at a temperature range at which an electrochemical cell comprising the scaffold 10 typically operates, (e.g., between about 10 and about 70 degrees Celsius, and more typically between about 45 and about 55 degrees Celsius)), the first 60 and third 70 apertures each have a diameter (80 and 85, respectively) that is smaller than a fourth diameter 90 of the ceramic membrane 25. On the other hand, FIG. 3A shows that when the scaffold 10 is at an operating temperature, the second diameter 75 of the second aperture 65 is larger than the fourth diameter 90 of the ceramic membrane 25.

In still another non-limiting example of a characteristic the apertures (60, 65, and 70), FIG. 3A shows the second aperture 65 has a height H1 that is slightly larger than the height H2 of the ceramic membrane 25.

When the orifice 15 comprising the 3 described apertures (60, 65, and 70) is at an operating temperature, the respective diameters (80, 75, and 85) may be sized to prevent the ceramic membrane 25 from being seated in, or being removed as a whole from, the orifice 15. However, when the scaffold 10 is heated to a sufficient temperature and for a sufficient amount of time, the scaffold 10 expands in a manner that causes the orifice 15 to expand so that the entire ceramic membrane 25 can be seated in or extracted from the orifice 15. The point at which heating the scaffold 10 causes the orifice 15 to expand to the extent that the entire membrane 25 can be inserted into and/or extracted from the orifice 15 is referred to herein as the ("insertion point"). To better explain how the orifice 15 can be expanded to allow the entire ceramic membrane 25 to be seated therein, some non-limiting examples of suitable diameters for the first 60, second 65, and third 70 apertures at an operating temperature are provided below. Following this discussion, some non-limiting examples of suitable diameters for the 3 apertures (60, 65, and 70) at an insertion point are provided. In one embodiment the first aperture 60 and third aperture 70 are the same size. In other embodiments, one of the first aperture 60 and third aperture 70 is larger than the other.

In one non-limiting example, when the scaffold 10 is at an operating temperature, the first diameter 80 of the first aperture 60 can be any suitable size that allows the ceramic membrane 25 to function as intended while allowing the first aperture's diameter 80 to be smaller than the ceramic membrane's diameter 90. In one non-limiting embodiment, at an operating temperature, the first diameter 80 of the first aperture 60 is between about 0% and about 15% smaller than the fourth diameter 90 of the ceramic membrane 25. In other non-limiting embodiments, at an operating temperature, the first diameter 80 of the first aperture 60 is as little as about 0.03%, about 0.8%, or about 1.2% smaller than the ceramic membrane's first diameter 90.

Additionally, in some non-limiting embodiments, at an operating temperature, the first aperture's first diameter 80 is as much as about 1.8%, about 2%, or about 10% smaller than the fourth diameter 90 of the ceramic membrane 25. For instance, FIG. 3A illustrates an embodiment where the ceramic membrane's fourth diameter 90 is about 3 inches, the first diameter 80 of the first aperture 60 can be about 2.95 inches, or about 1.66% smaller than the ceramic membrane's fourth diameter 90.

In another non-limiting example, at an operating temperature, the second diameter 75 of the second aperture 65 may be any suitable amount larger than the ceramic membrane's fourth diameter 90 that allows the membrane 25 to be seated within the second aperture 65 so that the second aperture's inner surface 95 compresses the O-ring 55 against the membrane's outermost perimeter 50 to create a hermetic edge seal. In one non-limiting embodiment, at an operating temperature, the second diameter 75 of the second aperture 65 is between about 0% and about 15% larger than the fourth diameter 90 of the ceramic membrane 25. Indeed, in some non-limiting embodiments, at an operating temperature, the second diameter 75 of the second aperture 65 is as little as about 0.3%, about 0.5%, or about 1% larger than the fourth diameter 90 of the ceramic membrane 25. Furthermore, in some embodiments, at an operating temperature, the second aperture's second diameter 75 is as much as about 2%, about 5%, or about 9% larger than the ceramic membrane's fourth diameter 90. For instance, FIG. 3A shows that in an embodiment where the ceramic membrane's fourth diameter 90 is about 3 inches at an operating temperature, the second diameter 75 of the second aperture 65 can be about 3.09 inches, or about 3% longer than the membrane's fourth diameter 90.

As a side note to the previous non-limiting examples, the second aperture's second diameter 75 may be configured so that at an operating temperature the scaffold 10 compresses the O-ring 55 between the ceramic membrane's outermost perimeter 50 and the second aperture's inner surface 95 to any suitable extent that forms a hermetic edge seal between the membrane 25 and the scaffold 10. In one non-limiting embodiment, at an operating temperature, the second diameter 75 of the second aperture 65 is configured to compress the cross-sectional diameter of the O-ring 55 between about 0% and about 70% of the O-ring's uncompressed state. Indeed, in some embodiments, the second aperture's second diameter, at an operating temperature, is configured to compress the cross-sectional diameter of the O-ring 55 as little as about 5%, about 15%, or about 25% from the O-ring's uncompressed state. Similarly, in some embodiments, at an operating temperature, the second aperture's second diameter is configured to compress the cross-sectional diameter of the O-ring 55 as much as about 30%, about 40%, or about 70% from the O-ring's uncompressed state. By way of illustration, FIGS. 3B (and 3A) shows that where the second aperture's second diameter 75 is about 3.09 inches at an operating temperature and where the ceramic membrane's fourth diameter 90 is about 3 inches, an O-ring 55 that originally had a cross-sectional diameter of about 0.07 inches is compressed to have a cross-sectional diameter D1 (see FIG. 3B) of about 0.04 inches, which is about 43% smaller than its uncompressed cross-sectional diameter.

In still another non-limiting example, at an operating temperature, the third diameter 85 of the third aperture 70 may be any suitable amount smaller than the ceramic membrane's fourth diameter 90 that prevents the entire membrane 25 from passing through the third aperture 70, as long as the third aperture 70 is still capable of allowing the entire ceramic membrane 25 to pass through the third diameter 70 when the scaffold 10 is heated to an insertion point. In one non-limiting embodiment, at an operating temperature, the third diameter 85 of the third aperture 70 is between about 0% and 10% smaller than the fourth diameter 90 of the ceramic membrane 25. In some non-limiting embodiments, at an operating temperature, the third diameter 85 of the third aperture 70 is as little as about 0.01%, about 0.5%, or about 0.6% smaller than the fourth diameter 90 of the ceramic membrane 25. Additionally, in some non-limiting embodiments, the third diameter 85 of the third aperture 70 is as much as about 1.2%, about 2%, or about 6% smaller than the fourth diameter 90 of the ceramic membrane 25. By way of illustration, FIG. 3A illustrates an embodiment showing that where the ceramic membrane's fourth diameter 90 is about 3 inches, the third diameter 85 of the third aperture 70 can be about 2.97 inches at an operating temperature, or about 1% smaller than the membrane's fourth diameter 90.

When the scaffold 10 is heated to achieve an insertion point, the diameters of the various apertures (60, 65, and 70) can expand to become any suitable amount larger or smaller than the diameter 90 of the ceramic membrane 25 that allows the apertures to function as intended.

In one non-limiting example, when the scaffold 10 is heated to achieve an insertion point, the first aperture's first diameter 80 may expand from its original size to any suitable size that prevents the entire membrane 25 from passing through that aperture's first diameter 80, while still allowing the membrane 25 to function as intended. In one non-limiting embodiment, when the scaffold 10 is heated to an insertion point, the first diameter 80 of the first aperture 60 becomes between about 0% and about 10% smaller than the fourth diameter 90 of the ceramic membrane 25. In some non-limiting embodiments, when the scaffold 10 is heated to an insertion point, the fourth diameter of the first aperture becomes as little as about 0.1%, about 0.3%, or about 0.5% smaller than the fourth diameter of the ceramic membrane 25. In other non-limiting embodiments, when the scaffold 10 is heated to an insertion point, the first diameter of the first aperture becomes as much as about 0.8%, about 2%, or about 6% smaller than the ceramic membrane's fourth diameter. For instance, when the fourth diameter of the ceramic membrane 25 is about 3 inches and the first diameter of the first aperture at an operating temperature is about 2.95 inches, the first diameter of the first aperture may expand to be about 2.98 inches (or about 0.67% smaller than the ceramic membrane's diameter) when the scaffold 10 is heated to an insertion point.

In another non-limiting example, when the scaffold 10 is heated to an insertion point, the second aperture's second diameter 75 may expand from its original size to any size that allows the ceramic membrane 25 and the O-ring 55 to be inserted into the second aperture 65 so that an hermetic edge seal is formed between the membrane's outermost perimeter 50 an the inner surface 95 of the second aperture 65. In one non-limiting embodiment, when the scaffold 10 is heated to an insertion point, the second diameter 75 of the second aperture 65 becomes between about 0% and about 15% larger than the fourth diameter 90 of the ceramic membrane 25. Indeed, in some embodiments, when the scaffold 10 is heated to an insertion point, the second diameter 75 of the second aperture 65 becomes as little as about 1%, about 2%, or about 4% larger than the fourth diameter 90 of the ceramic membrane 25. Conversely, in some non-limiting embodiments, when the scaffold 10 is heated to an insertion point, the second diameter 75 of the second aperture 65 becomes as much as about 4.5%, about 6.5%, or about 12% larger than the ceramic membrane's diameter. For instance, when the fourth diameter of the ceramic membrane 25 is about 3 inches and the first diameter of the first aperture at an operating temperature is about 3.05 inches, the second diameter of the second aperture may expand to become about 3.15 inches (or about 5% larger than the ceramic membrane's fourth diameter) when the scaffold 10 is heated to an insertion point.

In still another non-limiting example, when the scaffold 10 is heated to an insertion point, the third aperture's third diameter 85 may expand from its original size at operating temperature to any size that allows the entire membrane 25 to be pushed through third aperture 70 so as to be seated within the second aperture 65. In one non-limiting embodiment, when the scaffold 10 is heated to an insertion point, the third diameter 85 of the third aperture 70 becomes between about 0% and about 10% larger than the diameter 90 of the ceramic membrane 25. Indeed, in some non-limiting embodiments, when the scaffold 10 is heated to an insertion point, the third diameter of the third aperture becomes as little as about 0.1%, about 0.3%, or about 0.5% larger than the diameter of the ceramic membrane 25. On the other hand, in some non-limiting embodiments, when the scaffold 10 is heated to an insertion point, the diameter of the first aperture becomes as much as about 0.8%, about 2%, or about 6% larger than the ceramic membrane's diameter. For instance, when the fourth diameter of the ceramic membrane 25 is about 3 inches and the third diameter of the third aperture at an operating temperature is about 2.98 inches, the first diameter of the first aperture may expand to become about 3.02 inches (or about 0.67% larger than the ceramic membrane's diameter) when the scaffold 10 is heated to an insertion point.

Turning now to the thermoplastic plate 20, the plate 20 can have any suitable characteristic that allows it to hold one or more ion-conductive ceramic membranes 25 and to hermetically separate an anode solution and a cathode solution within an electrochemical cell. In one previously mentioned example, the plate 20 can comprise any suitable number of orifices 15. In another non-limiting example, the plate 20 comprises a monolithic material that is chemically stable when used in an electrochemical cell and which has a coefficient of thermal expansion ("CTE") that is sufficient to allow the diameters of the orifices 15 to expand and contract in the manner previously described. While the plate 20 can comprise any suitable material, in some embodiments, the plate 20 comprises polypropylene and/or high density polyethylene ("HDPE"). The plate 20 may be configured in a variety of sizes. In one embodiment, the plate is sized to allow it to interface and mate with a commercially available anode flow promoter 100 and a cathode flow promoter 105 (as shown in FIG. 4)

Figure 4:
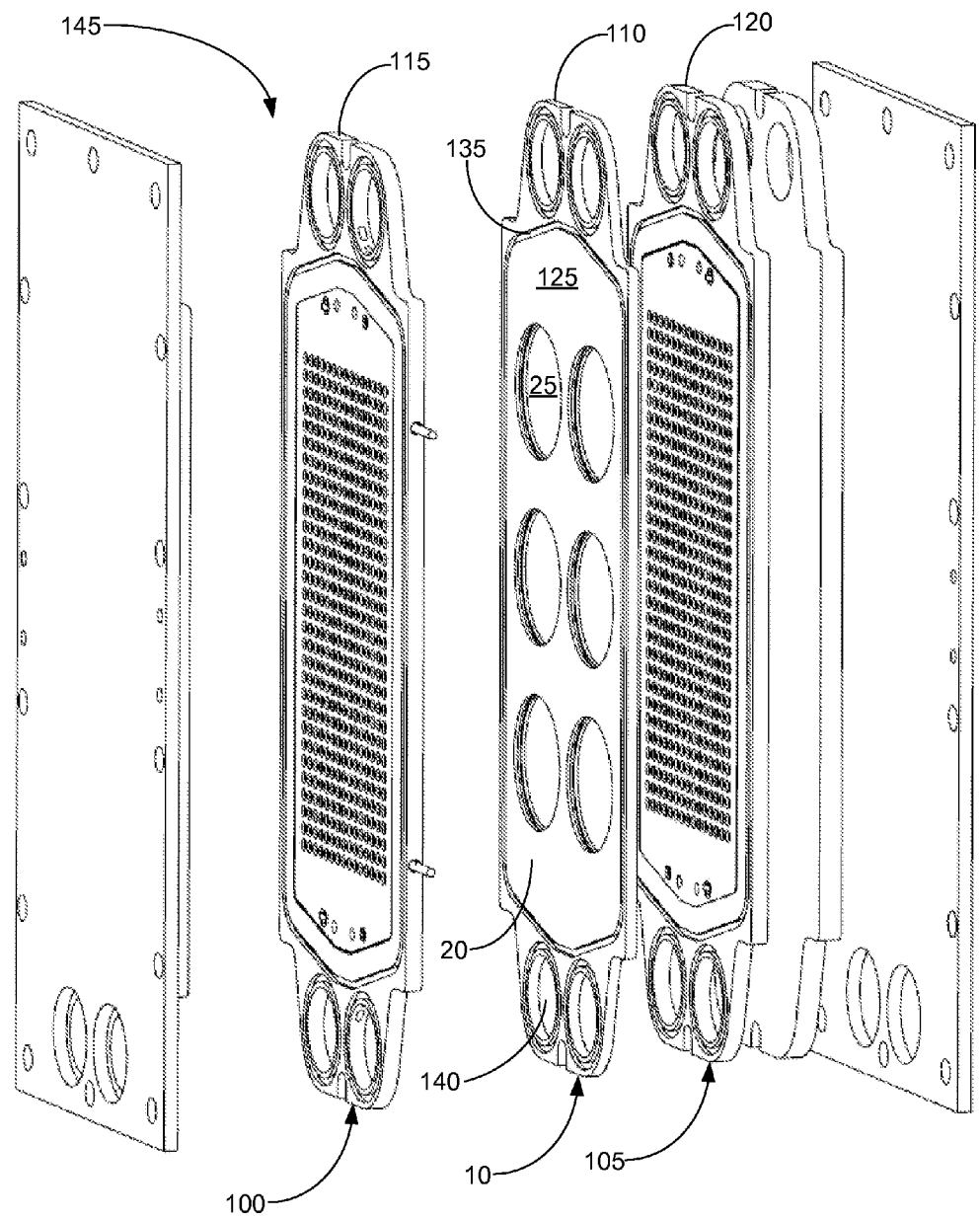
FIG. 4 depicts an perspective, exploded view of a representative embodiment of a planar electrolytic cell comprising the membrane scaffold.

Turning now to FIG. 4, the plate 20 is shown as used in an electrochemical cell 145. FIG. 4 shows a representative embodiment in which the external perimeter 110 of thermoplastic plate 20 substantially matches the external perimeters (115 and 120, respectively) of the anode 100 and cathode 105 flow promoters. Moreover, FIG. 4 shows that the plate 20 can comprise a first surface 125 for interfacing with the anode flow promoter 100 and a second surface 130 (not shown) for interfacing with the cathode flow promoter 105.

In yet another non-limiting example, the plate 20 can comprise any feature that allows it to be used with an electrochemical cell 145. For instance, while the plate 20 can be hermetically sealed with an anode 100 and a cathode 105 flow promoter in any suitable manner, FIG. 4 shows an embodiment in which the plate 20 comprises a gasket 135 that extends around the orifices 15 that are defined in the plate 20. In other instances, FIG. 4 shows an embodiment in which the plate 20 comprises at least one fluid flow port 140 that allows fluid (such as an anolyte or a catholyte solution) to be channeled directly through the plate 20 to another component of the electrochemical cell 145.

Figure 3B:
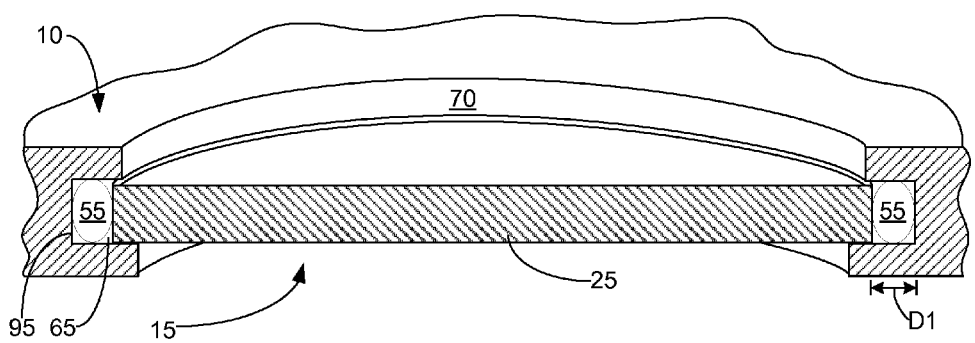
FIG. 3B depicts a cross-sectional perspective view of the membrane scaffold from FIG. 1 cut along line A-A, wherein the ceramic membrane from FIG. 1 is disposed within an orifice in the scaffold.

Turning now to FIG. 3B, the O-ring 55 is positioned between the inner surface 95 of the second aperture 65 and the outermost perimeter of the ceramic membrane 25. The O-ring 55 may have any characteristic that allows it to form a hermetic edge seal between the membrane 25 and the orifice 15 and to be chemically stable when used in an electrochemical cell. By way of example, the O-ring 55 may comprise any suitable material that allows it to function as intended. Some examples of suitable O-ring materials include, but are not limited to, an ethylene propylene diene monomer ("EPDM") rubber, a synthetic rubber, and/or a fluoropolymer elastomer (such as a VITON® O-ring, produced by DuPont).

With respect to the circular ceramic membrane 25, the membrane 25 may comprise any ion-conductive membrane 25 that is suitable for use in an electrolytic cell, capable of forming a hermetic edge seal with the thermoplastic plate 20; and capable of selectively transporting ions between the two solutions. Some examples of suitable ceramic membrane materials include, but are not limited to, Metal Super Ion Conductive materials ("MSICON-type materials"), sodium β-alumina membranes, and other suitable cation-conductive ceramic membranes. Where the ceramic membrane 25 comprises a MSICON-type material, the ceramic membrane 25 may comprise any suitable MSICON-type material, including, but not limited to a known or novel form of a sodium Super Ion Conductive material (a "NaSICON-type material"), a Lithium Super Ion Conductive material (a "LiSICON-type material"), and a potassium Super Ion Conductive material (a "KSICON-type material"). For a more detailed description of suitable MSICON-type materials, see U.S. Patent Publication No. 2009/0057162, entitled Electrolytic Process to Separate Alkali Metal Ions from Salts of Glycerine, filed Mar. 5, 2009; the entire disclosure of which is hereby incorporated by reference. Other alkali ion selective ceramic membranes may also be used and are within the scope of this invention.

The ceramic membrane 25, may take the form of several shapes. In one embodiment, the ceramic membrane 25 is a circular wafer of substantially uniform thickness. Where the ceramic membrane 25 is of a different shape, the orifice 15 of the scaffold 10 is configured to seal the ceramic membrane 25 there within.

The ceramic membranes 25, O-rings 55, and thermoplastic plate 20 may be assembled to form the membrane scaffold 10 in any suitable manner. By way of non-limiting example, FIG. 5 illustrates a flow chart showing one method 200 for assembling the scaffold 10.

Figure 5:
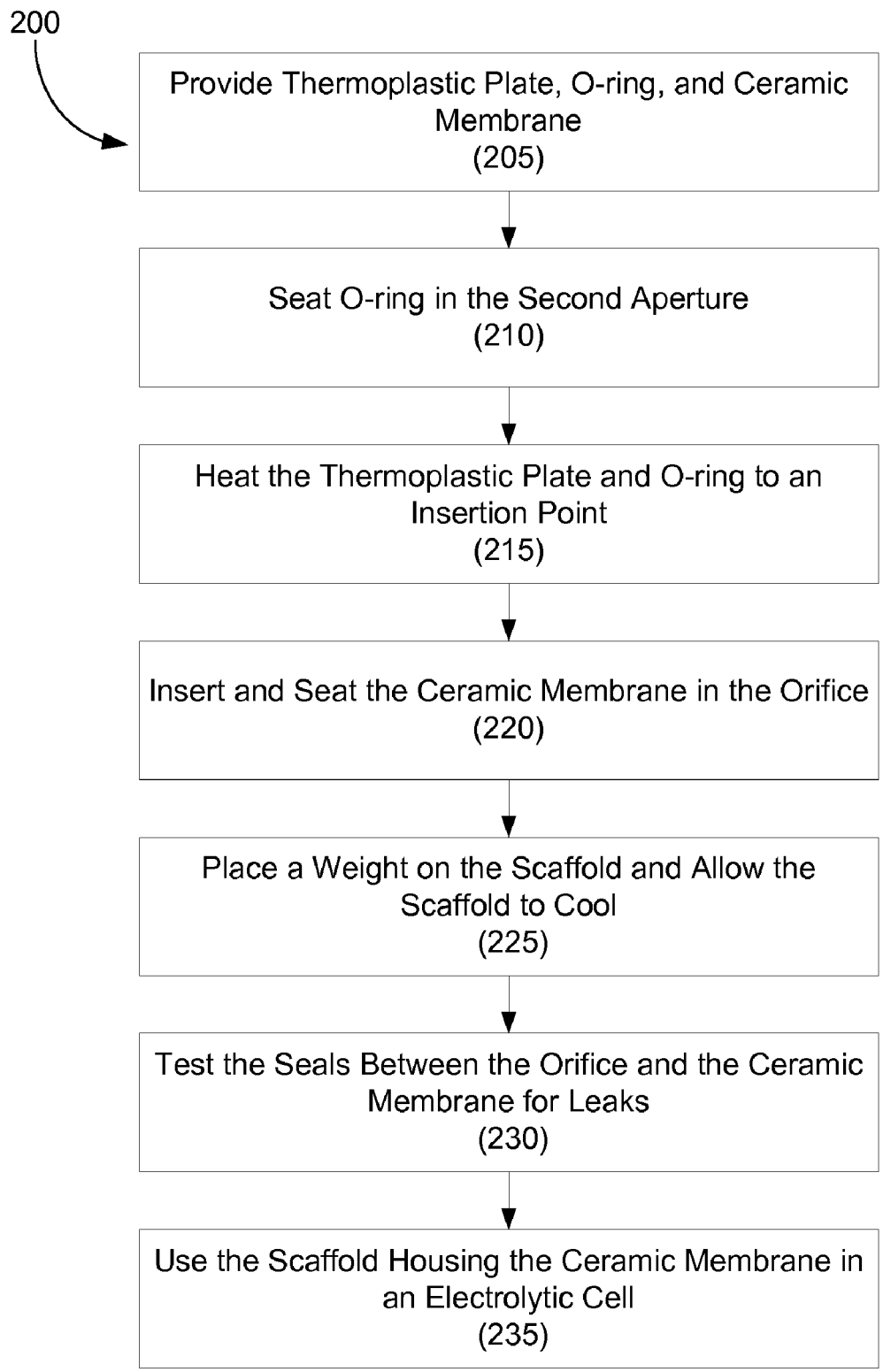
FIG. 5 depicts flow chart of a representative embodiment of a method for sealing the ceramic membrane in the membrane scaffold.

Specifically, FIG. 5 at 205 shows the method 200 begins by providing the described thermoplastic plate 20, O-rings 55, and ion-conductive ceramic membrane 25. As the method 200 continues, in step 210 the O-rings 55 are inserted into the orifices 15 defined in the plate 20 so as to be concentrically seated within the orifice's second aperture 65.

With the O-rings 55 in place, at step 215 the plate 20 and the O-rings 55 can be heated until the plate 20 reaches an insertion point. In this regard, the heating temperature and the amount of time needed to heat the plate 20 to an insertion point may vary depending on the material used in the thermoplastic plate 20, including its CTE and the size and thickness of the plate 20. That said, in some embodiments, the heating temperature is below the melting point of the material used in the thermoplastic plate 20 and is also low enough to allow the plate 20 to shrink to its original size as the plate 20 cools.

In some non-limiting embodiments in which the thermoplastic plate 20 comprises polypropylene, the heating temperature used to achieve an insertion point is a temperature that is less than about 160, 155, or 150 degrees Celsius. Moreover, in some non-limiting embodiments in which the thermoplastic plate 20 comprises polypropylene, the heating temperature used to achieve an insertion point is more than about 100, 120, or 130 degrees Celsius. Indeed, in some instances, the heating temperature used to achieve the insertion point of a polypropylene thermoplastic plate 20 is about 130 degrees Celsius ±5 degrees.

In some embodiments in which the thermoplastic plate 20 comprises HPDE, the heating temperature used achieve the insertion point is below about 130, about 125, or about 120 degrees Celsius. Additionally, in some embodiments in which the plate 20 comprises HDPE, the heating temperature used to heat the plate 20 to an insertion point is above about 110, about 115, or about 118 degrees Celsius. Indeed, in some instances, the heating temperature used to achieve heat the plate 20 comprising HDPE to an insertion point is about 120 degrees Celsius ±5 degrees.

With further respect to heating the plate 20 to an insertion point, the thermoplastic plate 20 may be heated for any suitable period of time that allows the diameters (60, 65, and 70) of the orifices 15 to expand sufficiently to allow the ceramic membranes 25 to be properly seated and sealed in the orifice's second apertures 65. In some embodiments, in order to heat the thermoplastic plate 20 to an insertion point, the plate 20 is heated for less than about 20, 15, 10, or 8 minutes. In some embodiments, the plate 20 is heated for more than about 1, 2, 3, 4, or 5 minutes.

Returning to the method 200, FIG. 5 at step 220 shows that once the thermoplastic plate 20 has been heated to an insertion point, a uniform pressure can be applied across a surface of each ceramic membrane 25 to push the membrane 25s through the third apertures 70 into the second apertures 65 so that the O-ring 55 in each orifice 15 is disposed between the membrane's outermost perimeter 50 and the second aperture's inner surface 95. As previously described, because the diameter of the first perimeter may remain smaller than the fourth diameter of the ceramic membrane 25, the first perimeter can prevent the ceramic membrane 25 from being pushed completely through the orifice 15. Additionally, because the first aperture has a smaller diameter than the ceramic membrane 25, the ceramic membrane 25 may be squarely seated within the orifice 15, towards the bottom of the second aperture.

In step 225, the scaffold 10 is allowed to cool so that the various diameters of the apertures contract to trap and hermetically seal the ceramic membranes 25 in the orifices 15. While this cooling process may be accomplished in any suitable manner, in at least some embodiments, a weight may be placed on top of the scaffold 10 to prevent the scaffold 10 from warping as it cools and contracts back to its original size.

With the ceramic membranes 25 sealed in the thermoplastic plate 20, step 230 shows that the scaffold 10 can be tested to ensure that each of the ceramic membranes 25 in each of the scaffold's orifices 15 is hermetically sealed in the scaffold 10.

Figure 6A:
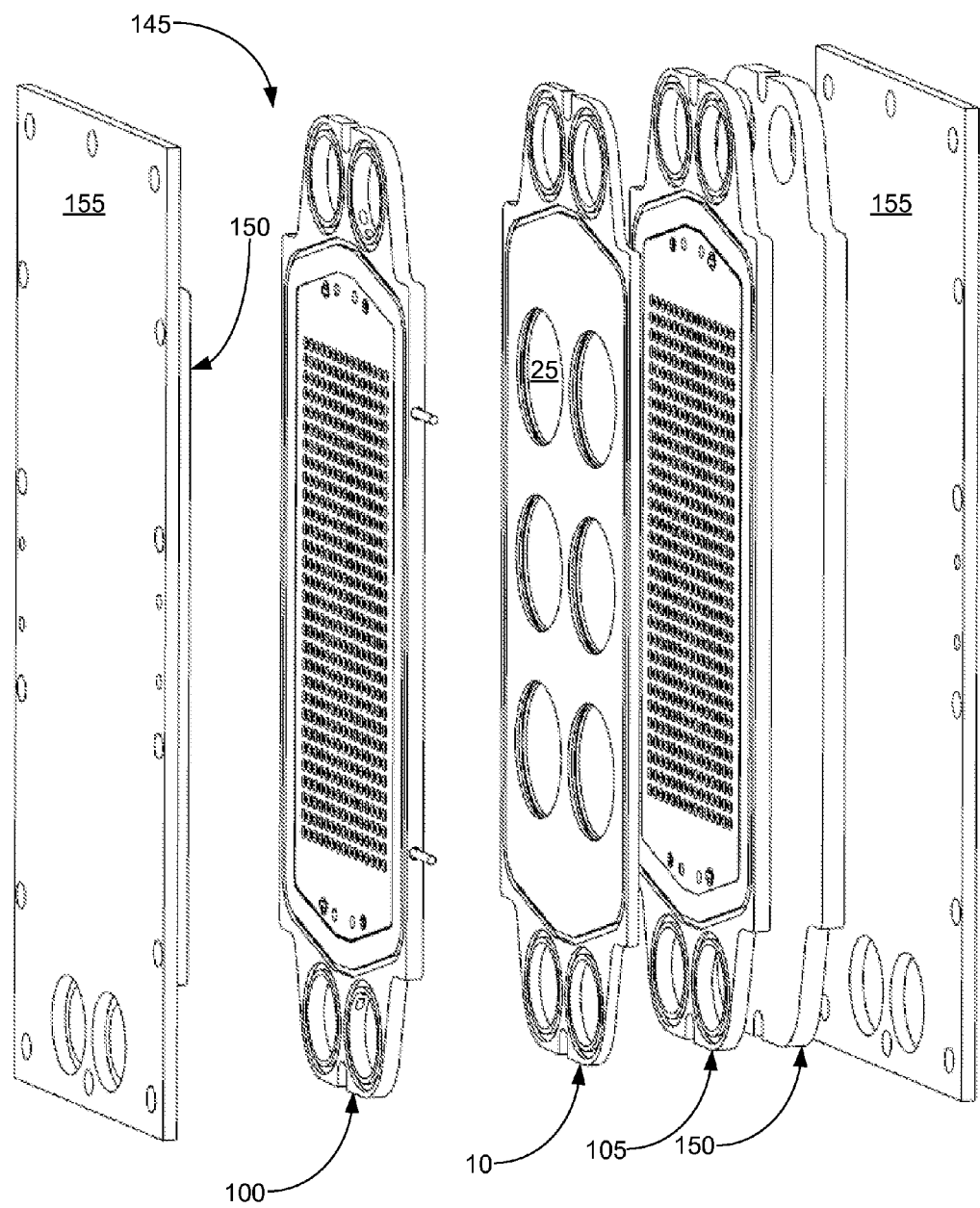
FIG. 6A depicts an perspective, exploded view of a representative embodiment of a planar electrolytic cell comprising the membrane scaffold.

Once the assembled scaffold 10 has been found free from leaks, in step 235 the scaffold 10 may be used in an electrochemical cell. Although the membrane scaffold 10 can be used in any suitable electrochemical cell, in some embodiments, the scaffold 10 is used in a known or novel planar electrolytic cell.

Where the scaffold 10 is used in a planar electrolytic cell, the cell may have any suitable component or characteristic. Indeed, in one non-limiting example, while the cell can comprise any suitable number of membrane scaffolds 10, including, but not limited to 1, 2, 3, 4, or more, FIG. 6A shows that each membrane scaffold 10 may directly interface with one anode flow promoter 100 and one cathode flow promoter 105. Accordingly, the anode and the cathode flow promoters can, respectively, disperse anolyte solution and catholyte solution on opposite sides of the scaffold's ceramic membranes 25. Moreover, the anode electrode and the cathode electrode in the two flow promoters can be used to cause certain cations (e.g., sodium, lithium, or potassium) to be selectively transported through the ceramic membrane 25 as the electrolytic cell functions.

When one or more anode flow promoters 100, membrane scaffolds 10, and cathode flow promoters 105 are stacked together in an alternating manner, FIG. 6A shows that endplates 150 can be disposed at each end of the stack. These endplates 150 may serve a variety of functions. For instance, each endplate 150 can interface with one side of an anode or cathode flow promoter and can be connected (e.g., bolted to or otherwise tightened to) the other endplate 150 at the opposite end of the stack of components to create a leak tight seal between the alternating anode flow promoter(s), membrane scaffold(s), and cathode flow promoter(s).

Figure 6B:
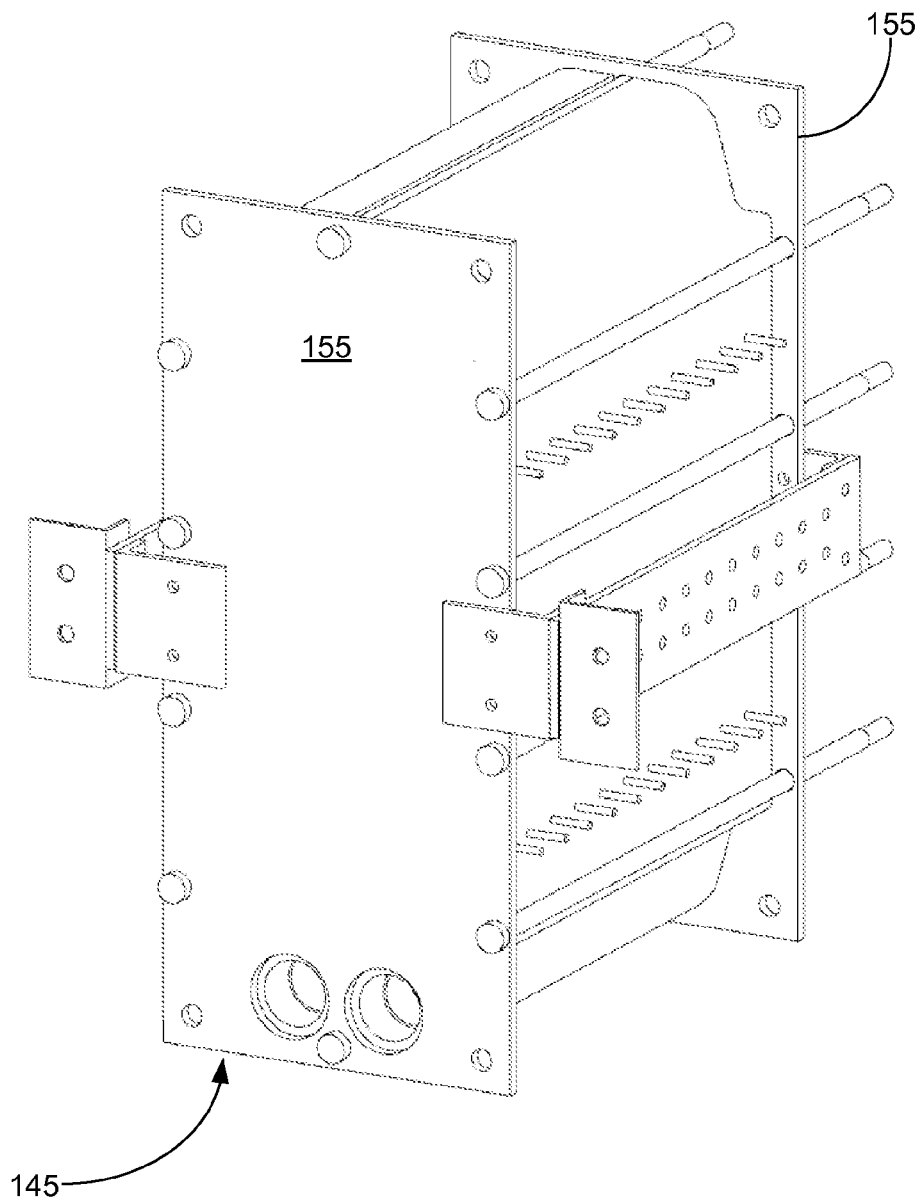
FIG. 6B depicts a perspective view of a representative embodiment of an assembled planar electrolytic cell comprising the membrane scaffold.

In addition to the aforementioned components, the electrolytic cell may comprise any other suitable component. For instance, FIG. 6A shows that the cell 145 optionally comprises frame plates 155 at each end of the cell 145. In this regard, FIG. 6B shows the frame plates 155 can be tightened together to ensure that the endplates 150, flow promoters, and membrane scaffold 10 or scaffolds 10 (not shown individually) are tightly joined so that fluids do not undesirably leak from the cell 145.

While specific embodiments and examples of the present invention have been illustrated and described, numerous modifications come to mind without significantly departing from the spirit of the invention and the scope of protection is only limited by the scope of the accompanying claims and not by any of the described embodiments or examples.

The invention claimed is:

1. A membrane scaffold comprising:
   a thermoplastic plate defining at least one orifice, wherein the orifice is defined by a first aperture having a first diameter, a second aperture having a second diameter, and a third aperture having a third diameter, wherein the second aperture is disposed between the first aperture and the third aperture, wherein the second diameter is larger than the first diameter and the third diameter; and
   an ion-conductive ceramic membrane disposed within the second aperture of the orifice in a manner such that an outermost perimeter of the ceramic membrane is edge sealed with an inner surface of the second aperture, wherein, at an operating temperature, the ceramic membrane has a fourth diameter that is greater than the first diameter of the first aperture and the third diameter of the third aperture.

2. The membrane scaffold of claim 1, wherein the first diameter is smaller than the third diameter.

3. The membrane scaffold of claim 1, further comprising an O-ring that is compressed between the outermost perimeter of the ceramic membrane and the inner surface of the second aperture.

4. The membrane scaffold of claim 1, wherein the thermoplastic plate comprises a material that has a coefficient of thermal expansion such that heating the plate to a sufficient temperature and for a sufficient period of time causes the third diameter of the third aperture to expand to be larger than the fourth diameter of the ceramic membrane while the first diameter of the first aperture remains smaller than the fourth diameter of the ceramic membrane.

5. The membrane scaffold of claim 1, wherein the ceramic membrane comprises a ceramic material selected from a NaSICON-type material, a LiSICON-type material, and a KSICON-type material.

6. The membrane scaffold of claim 1, wherein the ceramic membrane comprises a NaSICON-type material.

7. The membrane scaffold of claim 1, wherein the ceramic membrane comprises a circular wafer.

8. The membrane scaffold of claim 1, wherein the scaffold comprises a plurality of ion-conductive ceramic membranes disposed within a plurality of orifices.

9. The membrane scaffold of claim 1, wherein at an operating temperature, the first diameter of the first aperture is between about 0% and about 15% smaller than the fourth diameter of the ceramic membrane.

10. The membrane scaffold of claim 1, wherein at an operating temperature, the second diameter of the second aperture is between about 0% and about 15% larger than the fourth diameter of the ceramic membrane.

11. The membrane scaffold of claim 3, wherein at an operating temperature, the second diameter of the second aperture is configured to compress a cross-sectional diameter of the O-ring between about 0% and about 70% of the O-ring's uncompressed state.

12. The membrane scaffold of claim 1, wherein at an operating temperature, the third diameter of the third aperture is between about 0% and 10% smaller than the fourth diameter of the ceramic membrane.

13. The membrane scaffold of claim 1, wherein when the scaffold is heated to an insertion point, the first diameter of the first aperture becomes between about 0% and about 10% smaller than the fourth diameter of the ceramic membrane.

14. The membrane scaffold of claim 1, wherein when the scaffold is heated to an insertion point, the second diameter of the second aperture becomes between about 0% and about 15% larger than the fourth diameter of the ceramic membrane.

15. The membrane scaffold of claim 1, wherein when the scaffold is heated to an insertion point, the third diameter of the third aperture becomes between about 0% and 10% larger than the fourth diameter of the ceramic membrane.

16. A method for assembling a membrane scaffold, the method comprising:
    providing a thermoplastic plate defining at least one orifice, wherein the orifice is defined by a first aperture having a first diameter, a second aperture having a second diameter, and a third aperture having a third diameter, wherein the second aperture is disposed between the first aperture and the third aperture, wherein the second diameter is larger than the first diameter and the third diameter;
    providing an ion-conductive ceramic membrane, wherein at an operating temperature the ceramic membrane has a fourth diameter that is greater than the first diameter of the first aperture and the third diameter of the third aperture;
    heating the scaffold to a sufficient temperature above the operating temperature and for a sufficient period of time to cause the third diameter of the third aperture to become larger than the forth diameter of the ceramic membrane;
    placing the ceramic membrane within the orifice; and
    allowing the scaffold to cool so that an outermost perimeter of the ceramic membrane is edge sealed with an inner surface of the second orifice and the third diameter of the third aperture contracts to be smaller than the fourth width of the ceramic membrane.

17. The method of claim 16, wherein the first diameter is smaller than the third diameter.

18. The method of claim 16, further comprising placing an O-ring between the outermost perimeter of the ceramic membrane and the inner surface of the second aperture.

19. The method of claim 16, wherein the ceramic membrane comprises a NaSICON-type material.

20. The method of claim 16, wherein the first diameter of the first aperture remains smaller than the fourth diameter of the ceramic membrane during the heating of the scaffold.

21. The method of claim 16, wherein heating the scaffold involves heating the scaffold to a temperature above about 100 degrees Celsius and less than about 160 degrees Celsius.

22. The method of claim 21, wherein the heating the scaffold involves heating the scaffold for a period of time between about 1 and about 20 minutes.

23. The method of claim 16, wherein the scaffold comprises placing a plurality of ion-conductive ceramic membranes within a plurality of orifices.

24. The method of claim 16, wherein the heating the scaffold causes the third diameter of the third aperture to expand to be about 0.1% to about 6% larger than the third diameter of the third aperture at the operating temperature.

25. The method of claim 16, wherein at an operating temperature, the first diameter of the first aperture is between about 0% and about 15% smaller than the fourth diameter of the ceramic membrane.

26. The method of claim 16, wherein at an operating temperature, the second diameter of the second aperture is between about 0% and about 15% larger than the fourth diameter of the ceramic membrane.

27. The method of claim 18, wherein at an operating temperature, the second diameter of the second aperture is configured to compress a cross-sectional diameter of the O-ring between about 0% and about 70% of the O-ring's uncompressed state.

28. The method of claim 16, wherein at an operating temperature, the third diameter of the third aperture is between about 0% and 10% smaller than the fourth diameter of the ceramic membrane.

29. The method of claim 16, wherein when the scaffold is heated to an insertion point, the first diameter of the first aperture becomes between about 0% and about 10% smaller than the fourth diameter of the ceramic membrane.

30. The method of claim 16, wherein when the scaffold is heated to an insertion point, the second diameter of the second aperture becomes between about 0% and about 15% larger than the fourth diameter of the ceramic membrane.

31. The method of claim 16, wherein when the scaffold is heated to an insertion point, the third diameter of the third aperture becomes between about 0% and about 10% larger than the fourth diameter of the ceramic membrane.

32. An electrochemical cell comprising a membrane scaffold, the cell comprising:
    a first flow promoter comprising a cathode electrode;
    a second flow promoter comprising an anode electrode; and
    a membrane scaffold disposed between the first flow promoter and the second flow promoter, wherein the membrane scaffold comprises:
        a thermoplastic plate defining at least one orifice, wherein the orifice is defined by a first aperture having a first diameter, a second aperture having a second diameter, and a third aperture having a third diameter, wherein the second aperture is disposed between the first aperture and the third aperture, wherein the second diameter is larger than the first diameter and the third diameter, and wherein the first diameter is smaller than the third diameter; and
        an ion-conductive ceramic membrane disposed within the second aperture of the orifice in a manner such that an outermost perimeter of the ceramic membrane is edge sealed with an inner surface of the second aperture, wherein, at an operating temperature, the ceramic membrane has a fourth diameter that is greater than the first diameter of the first aperture and the third diameter of the third aperture.

33. The electrochemical cell of claim 17, wherein the ceramic membrane comprises a NaSICON-type material.

34. The electrochemical cell of claim 17, wherein the membrane scaffold further comprises an O-ring that is compressed between the outermost perimeter of the ceramic membrane and the inner surface of the second aperture.

35. The electrochemical cell of claim 17, wherein the thermoplastic plate comprises a material that has a coefficient of thermal expansion such that heating the plate to a sufficient temperature and for a sufficient period of time causes the third diameter of the third aperture to expand to be larger than the fourth diameter of the ceramic membrane while the first diameter of the first aperture remains smaller than the fourth diameter of the ceramic membrane.

* * * * *